Figure 1:
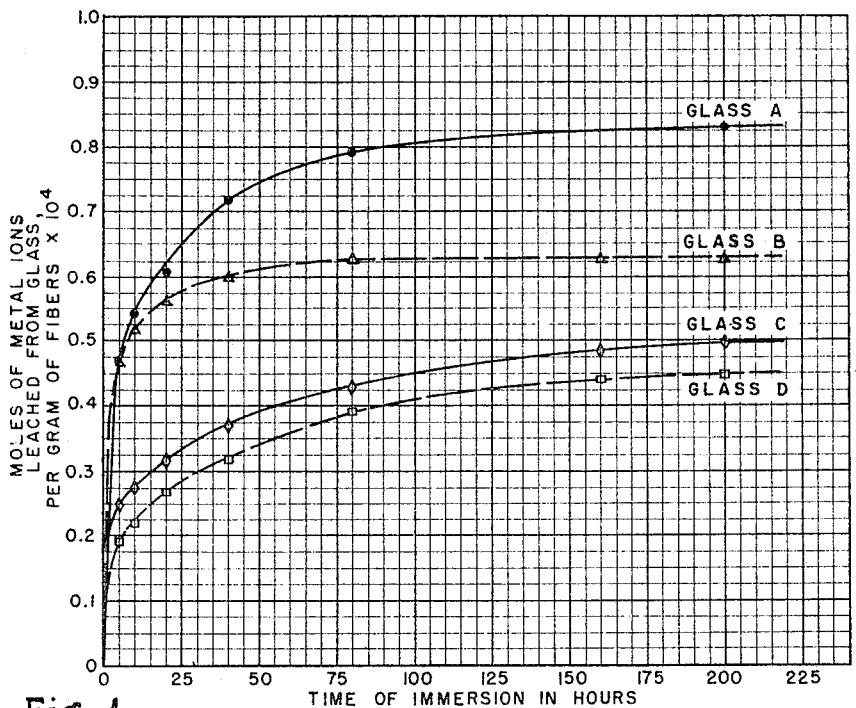

INVENTORS
ROBERT WONG, BELFORD D. WISE &
BY ALBERT R. MORRISON

ATTORNEYS

INVENTORS
ROBERT WONG, BELFORD D. WISE &
ALBERT R. MORRISON
BY
ATTORNEYS

United States Patent Office 3,288,582
Patented Nov. 29, 1966

3,288,582
METHOD OF MAKING A BONDED MAT OF SURFACE TREATED GLASS FIBERS
Robert Wong, Belford D. Wise, and Albert R. Morrison, Newark, Ohio, assignors to Owens-Corning Fiberglas Corporation, a corporation of Delaware
Filed May 20, 1960, Ser. No. 30,643
1 Claim. (Cl. 65—3)

The invention relates to surface treated glass and similar fibers, and, more particularly, to fibers which are surface treated to provide a lubricous coating which prevents the adsorption of moisture on the fibers, but without increasing the rate at which ions migrate from the fibers.

The need for a lubricous coating on glass fiber surfaces to prevent fiber breakage as a consequence of abrasion, and also the desirability of applying a coating to prevent or minimize moisture adsorption by glass fibers have been recognized. It has also been observed that alkaline materials, probably various ions, tend to migrate from glass and similar fibers. In extreme cases, for example when glass fibers are produced from ordinary "bottle" or soda-lime glass, the fibers disintegrate after a relatively short service life. The phenomenon has been attributed to adsorption of water on the fiber surfaces, and migration of alkaline ions from the glass to the layer of adsorbed water until the pH of the adsorbed water is sufficiently high that the glass surfaces are actively attacked thereby and the fibers are disintegrated.

What appears to be a logical suggestion for solving the problem of disintegration of glass fibers has been made. This suggestion (see Simpson Patent 2,184,320) is that an acid reacting material should be incorporated in such a binder as an oil or oil emulsion, and the resulting binder should then be applied to the fibers. The theory of this approach to the problem is that the alkaline constituents of the glass (probably principally sodium ions) which migrate therefrom will be neutralized by the acid or acid reacting material so that they cannot accumulate to such an extent that the glass is subjected to a pH sufficiently high to cause deterioration.

At about the time that the suggesion of the said Simpson patent was made, improved fiberizable glass compositions were discovered. The improved compositions were found to have extended service lives when in the form of fibers, and the necessity for preventing or minimizing ion migration was generally considered to have been avoided. It has now been found that ion migration, to a greater or lesser, but in any event comparatively slight extent occurs even in fibers made from such improved glasses. Even slight migration is an indication of what can be denominated incipient deterioration of the glass. Therefore, any treatment that the glass is given should be one which does not adversely affect the rate of ion migration. In addition, the treatment should be one which prevents water adsorption on the glass surface, which increases the lubricity of the surface, and which involves some sort of bonding between the fiber surface and the treating agent, so that the effect of the treatment is prolonged. Ideally, the fibers should be treated almost immediately after formation from a body of molten glass, and before they have been cooled to any appreciable extent, although certain benefits can also be achieved by eliminating adsorbed water from the surfaces of "old" fibers, and then treating the "old" fibers. Further, the treatment should be one which does not prevent wetting of the fibers by available binders, which, preferably, are aqueous dispersions of phenolformaldehyde partial condensation products.

So far as is known, no treatment for glass or other similar fibers had been suggested, prior to the instant invention, which treatment was capable of imparting to fibers the requisite degree of lubricity and protection against water adsorption, and where the treatment did not increase the rate of ion migration from the glass, or the rate of deterioration thereof.

The present invention is based upon the discovery of surface treated glass and similar fibers where the surface treatment is lubricous and hydrophobic in nature, and does not measurably increase the rate of ion migration from the fibers. In addition, the coating which is produced by the treatment is one which is durable because of actual bonding between the coating and glass, and is one to which available binders will adhere.

It is, therefore, an object of the invention to provide improved surface treated glass and similar fibers.

It is a further object of the invention to provide an improved method for treating glass and similar fibers.

It is still another object of the invention to provide a mass of treated glass or similar fibers where the fibers are intermeshed with one another in the mass, and bonded in more or less fixed positions by a binder material.

Figure 2:
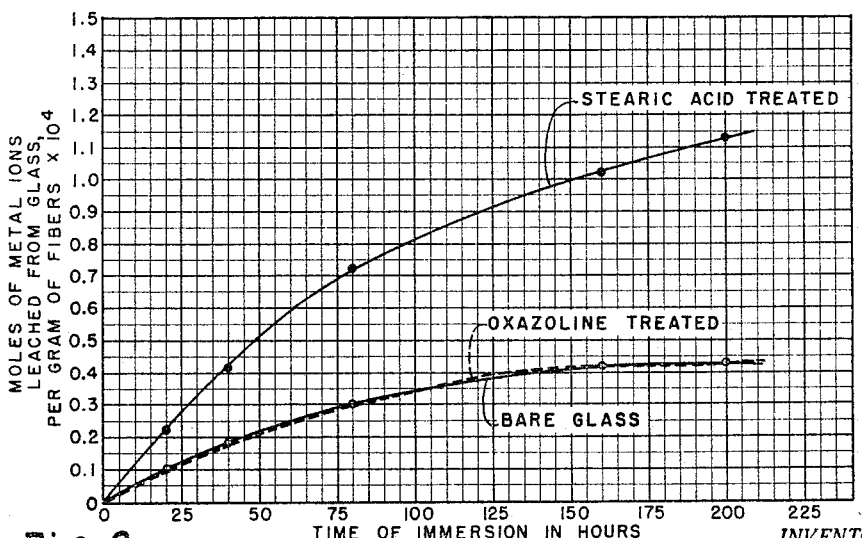
Figure 3:
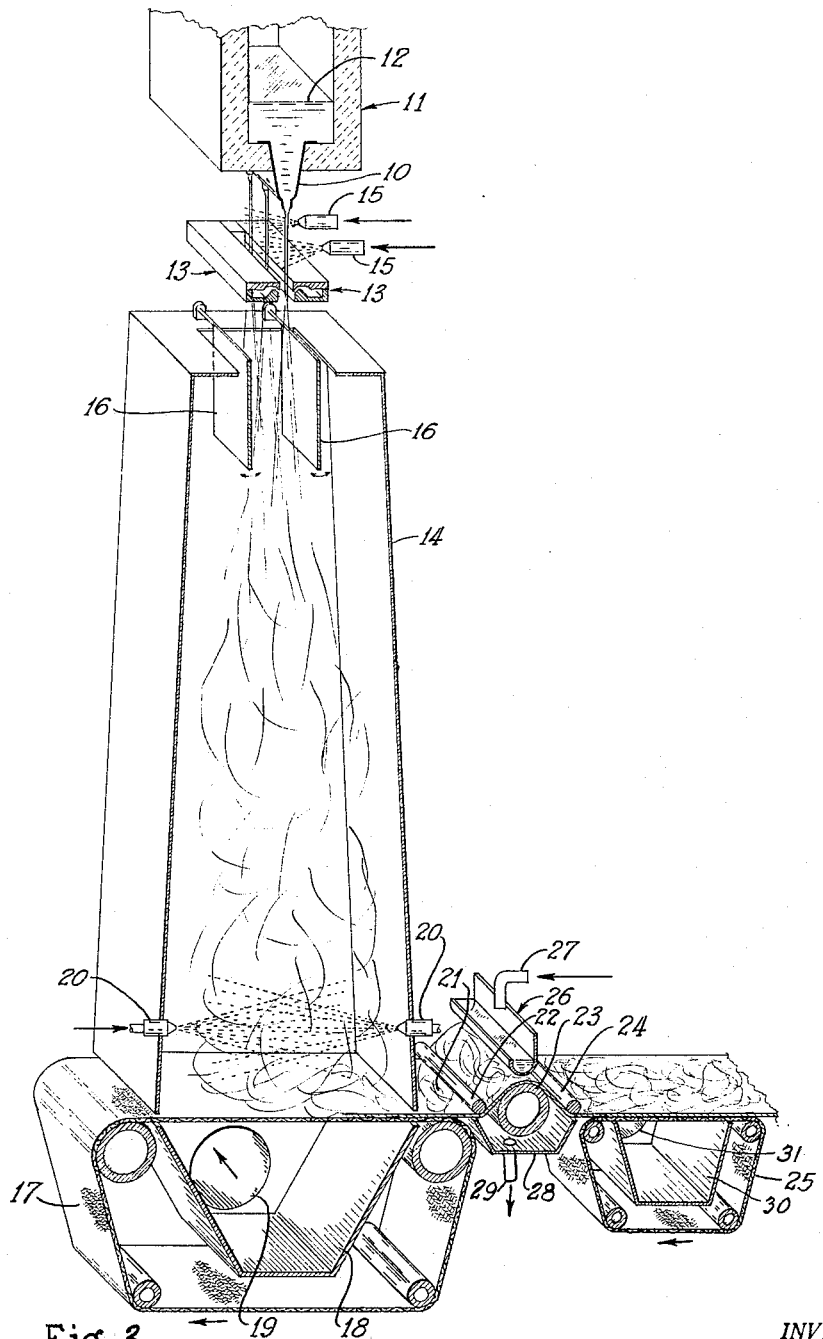

Other objects and advantages will be apparent from the description which follows, reference being made to the accompanying drawings, in which:

FIG. 1 is a plot showing, for several different glasses, ion migration as a function of time, ion migration being given as fraction of a gram mole of leached metal oxides, per gram of fibers having an average diameter of about 0.0040 inch;

FIG. 2 is a plot similar to FIG. 1, and showing the effect upon ion migration of a treatment according to the invention and of a previously suggested, and in some ways similar, treatment; and FIG. 3 is a view in perspective, with parts broken away to show details of construction of apparatus which is particularly suited for treating fibers in accordance with the invention and for producing a bonded mat product from the treated fibers.

According to the invention a treated vitreous fiber of glass or other similar material such as vitreous slag, vitrified rock or the like is provided. The treated fiber comprises the fiber and a coating which is composed of a surface active agent that produces an aqueous dispersion having a pH from about 6 to about 8½, and has a molecular structure which includes a hydrophobic portion and a hydrophilic portion which is bonded to the fiber surface. The surface active agent that is used to produce a coated or treated vitreous fiber according to the invention must be neither strongly acid reacting nor strongly alkaline reacting. If the surface active agent is strongly acid reacting, i.e., produces an aqueous dispersion having a pH less than about 6, treatment of glass or other similar fibers therewith will tend to increase the rate of ion migration from the glass, and, therefore, the rate of deterioration of the fibers. If the surface active agent has too high a pH, i.e., higher than about 8.5, the surface active agent itself will attack the fibers, and cause deterioration thereof. It will be appreciated that the hydrophilic portion of the surfactant molecule is responsible for the pH of an aqueous dispersion of the surfactant. In addition, the hydrophilic portion of the molecule is responsible for bonding between the surfactant and the fibers. It has been found that phenol, a particular silicone material and a $C_{17}H_{35}$ oxazoline surfactant are all adsorbed on glass from aqueous solutions with essentially the same heat effect. Since phenol and the surfactant are capable of interacting with the glass surface only by a hydrogen bond-type of adsorption, it follows that the silicone is also adsorbed by hydrogen bonding. Other groups capable of hydrogen bonding with a glass surface include aldehyde, sulfhydryl, nitrile, amide, amine, halide, and hydroxyl groups. Hydroxyl groups are capable of hydrogen bonding whether present in a molecule as part of a carboxylic acid or as part of an aliphatic alcohol. Surfactants which include, in the hydrophilic portion of the molecule, at least one of the groups listed above, or a phenolic hydroxyl group, and which form aqueous dispersions having a pH within the indicated range, therefore, constitute a preferred class. Excellent results have been achieved experimentally using surface active agents where the hydrophilic portion of the molecule is an oxazoline or an imidazoline. Such surfactants can be represented by the following formulas:

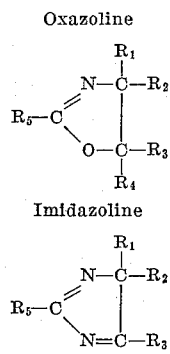

Oxazoline

Imidazoline where $R_1$, $R_2$, $R_3$ and $R_4$ can be the same or different, and each is hydrogen, an alkyl radical having from one to four carbon atoms, or a substituted alkyl radical having from one to four carbon atoms where the substituent is an aldehyde group, a sulfhydryl group, a nitrile group, an amide group, an amine group, a halide, a carboxyl group or a hydroxyl group. $R_5$ is a hydrocarbon having from 9 to 22 carbon atoms, and can be aliphatic or aromatic; where $R_5$ is aliphatic, it can be a straight or branched chain or a cyclic hydrocarbon.

Vitreous fibers which are treated with a surfactant in accordance with the invention are all man made fibers. Production techniques which are used involve flowing a stream of the material to be fiberized, and extending the stream, while in a fluid, vitreous condition, to form the fibers. The attenuation can be caused by the action of a blast of steam, combustion products or the like, or can be accomplished by use of suitable pulling wheels. Streams of molten, vitreous material are flowed through relatively large diameter orifices in the production of fibers from slag and mineral or rock, e.g., mineral or rock wool, while significantly smaller orifices are used in the production of glass fibers. The smaller orifices used in the production of glass fibers give rise to serious problems which do not exist in the other processes, and necessitate, for example, much closer control of the composition being fiberized. Treatment in accordance with the invention of any of the indicated types of vitreous fibers is advantageous, as it prevents or minimizes adsorption of water on the fiber surfaces and imparts lubricity to the fibers without appreciably affecting rate of ion migration. In all cases, water adsorption on bare vitreous fibers begins as soon as the fibers cool a sufficient amount below their forming temperature. Optimum results, therefore, are achieved by applying the surface active agent to the fibers immediately after formation, and preferably before they have cooled sufficiently for significant water adsorption to occur. Satisfactory results have been achieved by applying a $C_{17}H_{35}$ oxazoline surfactant to glass fibers immediately after formation, and while the fibers are still at a red heat.

Various techniques have been suggested for removing an adsorbed layer of water from glass or other vitreous fibers. For example, such fibers having an adsorbed surface layer of water can be heated, preferably under a vacuum, or desiccated with a suitable dehydrating agent such as acetone, sulfuric acid, aluminum chloride, or the like. It has been found, however, that complete removal of the adsorbed water is extremely difficult, if not impossible, at least when techniques which do not deteriorate the fiber surfaces are used. Accordingly, while significant improvement can be achieved by treating fibers in accordance with the invention after a layer of water has been adsorbed on the surfaces thereof, optimum results are achieved when the treatment is carried out before adsorption of water, and fibers having surfaces which are substantially completely free of adsorbed water and have been treated in accordance with the invention are a preferred product.

Binders, usually of the phenol-formaldehyde type, are frequently used with glass and other vitreous fibers to increase the product integrity of ultimate articles produced therefrom, for example insulating wools and boards. It will be appreciated that any surface active agent which is effective at preventing water adsorption on the fibers makes wetting of the fibers by an aqueous dispersion of a binder difficult. For example, when a conventional phenolic resin dispersion was applied to glass fibers which had been treated with a $C_{17}H_{35}$ oxazoline surfactant, and the binder-coated fibers were collected as a wool-like mass, compressed and heated to cure the binder, it was found that a board-like product was produced, but one which de-laminated readily and was, therefore, not a salable product. Upon de-lamination of the board it was noted that the dark brown color which is characteristic of phenolic binders extended only a short distance below the surfaces of the board, and that an unbonded compressed mass of treated fibers constituted the interior of the board. It has been found that from about 0.01 percent by weight to about 2.5 percent by weight of chitin can be added to an aqueous dispersion of a phenolic resin, and, when so added, enables the dispersion and the binder to wet the treated fibers. Chitin is a commercially available, naturally occurring material having the atomic formula $C_{30}H_{50}N_4O_{19}$, and the structural formula

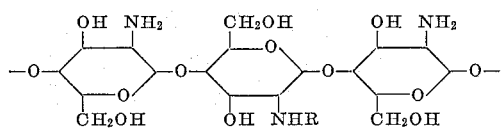

It has also been found that bone glue can be mixed with binders of the phenol-formaldehyde type, and, when so mixed, enables the dispersion of the binder to wet the treated fibers and the production of satisfactorily bonded products from the treated fibers. Optimum results have been achieved using binder compositions comprising from about 125 percent by weight to about 175 percent by weight of bone glue, based upon total phenol-formaldehyde solids.

FIG. 1 presents a series of curves, each of which represents, for a particular glass, the extent of ion migration, per unit of surface, as a function of time. The compositions of the several glasses are presented in Table I, below:

*Table I*

| Composition, percent by weight | Glass A | Glass B | Glass C | Glass D |
|---|---|---|---|---|
| $SiO_2$ | 73.9 | 60.4 | 53.7 | 57.1 |
| $Al_2O_3$ | 1.0 | 3.3 | 7.0 | 4.8 |
| $B_2O_3$ | 0 | 9.6 | 2.0 | 7.6 |
| $Na_2O$ | 15.2 | 14.4 | 10.8 | 14.3 |
| $K_2O$ | 0.6 | 0 | 0.4 | 0 |
| $M_nO_y$ (other metal oxides) | 0.3 | 12.3 | 26.1 | 16.2 |

Data for FIG. 1 were collected by immersing a 10 gram sample of fibers of each of the glasses in 450 cc. of distilled water. The fibers used for this test had diameters of $40 \times 10^{-5}$ inch. Samples of the water in which fibers of each of the indicated glasses had been immersed were removed periodically and analyzed by X-ray, by flame photometer, by gravimetric means, and for pH. The amount of alkali and metal ions migrating from the glass was thus determined quantitatively. The quantity of the elements which had migrated was then calculated, per gram of immersed fibers. The data which are plotted in FIG. 1 are presented in tabular form in Table II, below:

Table II

| \multicolumn{5}{c}{Moles×10⁴ of metal ions which migrated from the glass, per gram of glass fiber, after the indicated time, in hours} |

| Time | Glass A | Glass B | Glass C | Glass D |
| --- | --- | --- | --- | --- |
| 0   | 0    | 0    | 0    | 0    |
| 5   | 0.48 | 0.47 | 0.25 | 0.18 |
| 10  | 0.53 | 0.52 | 0.28 | 0.22 |
| 20  | 0.61 | 0.56 | 0.33 | 0.27 |
| 40  | 0.72 | 0.60 | 0.38 | 0.32 |
| 80  | 0.79 | 0.63 | 0.43 | 0.38 |
| 160 | 0.82 | 0.63 | 0.49 | 0.44 |
| 200 | 0.83 | 0.63 | 0.50 | 0.45 |

The following examples are presently solely for the purpose of further illustrating and disclosing the invention, and are in no way to be construed as limitations thereon.

EXAMPLE 1

A commercially available surface active agent was applied to hot glass fibers immediately after formation of the fibers from a body of molten glass. The surface active agent had the following formula:

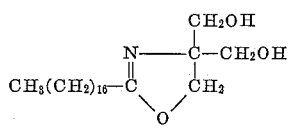

The pH of an aqueous dispersion of this treating agent is 7.3. The fibers to which the surface active agent was applied were formed by flowing streams of molten "Glass A" through relatively small diameter openings in the bottom of a glass melting tank and downwardly between cooperating steam blowers. When the glass advanced between the cooperating steam blowers, it was caught in a blast of steam issuing therefrom, and was projected downwardly by the blast of steam, causing attenuation of the molten glass closer to the melting tank. The surface active agent was sprayed onto the hot glass between the lower extremity of the melting tank and the steam blowers in the proportion of 1 pound of the surface active agent to 100–1,000 pounds of glass. Details of fiber-forming apparatus of the type indicated, and the operation thereof to produce glass fibers, will be found in U. S. Patent 2,206,058.

Glass fibers treated with the surface active agent were projected downwardly by the steam blast, and were collected on a foraminous conveyor moving below the steam blowers. The fibers collected were in the form of a wool-like mass of individual treated fibers ranging in length from about 5" to about 36", and having an average fiber diameter of about 40×10⁻⁵ inch. The mass of treated fibers had an unctuous feel, and was highly resistant to deterioration under humid conditions. This surface active agent has also been sprayed onto glass fibers being formed by other methods and with similar results.

A 10 gram sample of the treated fibers was tested for rate of ion migration by the method described above. The results are plotted in FIG. 2, together with the results of the ion migration test on untreated Glass A. It will be noted that the two curves are substantially identical, indicating that treatment of the fibers with the surface active agent did not appreciably change the rate of ion migration.

When, for purposes of comparison, but not in accordance with the invention, the procedure described in Example 1 was repeated, except that stearic acid rather than the indicated surface active agent, was applied to the fibers, the treated fibers were found to have a substantially higher rate of ion migration, as indicated by the said test, than either bare fibers of the same glass or fibers treated with the identified surface active agent. The data from this test are also plotted in FIG. 2. The higher rate of ion migration from fibers treated with stearic acid indicates an increased rate of fiber deterioration, and a correspondingly decreased useful service life.

EXAMPLE 2

The procedure described in Example 1 has also been used to apply different treating agents to Glass A, as well as to other glasses. The identity of the various treating agents that have been used, the pH of an aqueous dispersion thereof, the identity of the glass or glasses to which each treating agent has been applied, and the rate of treating agent to fibers are indicated in Table III, below:

Table III

| Identity of Treating Agent | pH of an aqueous dispersion of the treating agent | Identity of glass treated | Pounds of glass fibers per pound of treating agent |
| --- | --- | --- | --- |
| Cetyl alcohol | 7 | C* | 500 |
| $CH_3(CH_2)_{16}-C\overset{N-C(CH_2OH)(CH_2OH)}{\underset{O-CH_2}{\phantom{X}}}$ | 7.3 | C* | 500 |
| $CH_3(CH_2)_{16}-C\overset{N-C(CH_2OH)(CH_3)}{\underset{O-CH_2}{\phantom{X}}}$ | 7.3 | C* | 500 |
| $C_{17}H_{33}-C\overset{N-C(CH_2OH)(CH_2OH)}{\underset{O-CH_2}{\phantom{X}}}$ | 7.3 | C* | 500 |

\* Glass C, identified above.

The rates of ion migration from each of the several treated fibers identified in Table III were determined, and were found to be substantially identical with the rates of ion migration from untreated fibers of the same glasses.

EXAMPLE 3

A board-like product was produced from the treated fibers of Example 1 by spraying a phenolic binder composition onto the fiber surfaces below the cooperating steam blowers, but above the foraminous conveyor, and operating the conveyor at a speed such that the fibers coated with the phenolic binder accumulated in a wool-like mass on the conveyor to a thickness of about 4". The wool-like mass was then compressed to a thickness of about 1" and subjected to an elevated temperature of about 300° F. for 10 minutes to cure the phenolic binder and form the board-like product.

The phenolic binder composition was formulated from an aqueous dispersion of a phenol-formaldehyde partial condensation product produced from 180 parts of formaldehyde, added as 37 weight percent formalin solution, 100 parts of phenol and 4 parts of sodium hydroxide. The starting materials were mixed in a suitable vessel, allowed to stand at room temperature (about 25° C.) for approximately 6 hours, and then heated at a progressively increasing temperature. Heating was discontinued after about 8 hours when the temperature of the reaction mixture reached approximately 85° C. The sodium hydroxide reaction mixture was then neutralized with phosphoric acid, and the neutralized resin was filtered. The filtered resin was then subjected to vacuum distillation to remove water to a solids content of 76.2 percent by weight. The binder composition was produced by mixing 5 parts by weight of the above-identified phenol-formaldehyde resin dispersion, 38 parts by weight of water and 0.07 part by weight of chitin, and was applied in the proportion of about 1 pound of the dispersion to 12 pounds of the glass fibers.

The board-like product had substantially improved resiliency by comparison with a board produced in the same way from fibers which had not been treated with the surface active agent. For example, the board produced from treated fibers returned to 97 percent of its original thickness after it was subjected to a load of 50 pounds per square inch, while a board which was identical except that it had been produced from untreated fibers returned to only 63 percent of its original thickness after having been subjected to the same load.

Referring now to FIG. 3, the best presently known mode for practicing the instant invention will be described with reference thereto. Streams of glass are drawn through bushings 10 in the bottom of a glass melting tank 11 in which a body 12 of molten glass is maintained. The streams of glass are attenuated into fibers by the action of steam blowers indicated generally at 13 which also project the fibers downwardly into a forming hood 14. A 1 percent by weight solution in diacetone alcohol of the surface active agent identified in the first paragraph of Example 1, above, is sprayed onto the fibers, above the blowers 13, from spray heads 15, to which the solution is supplied in any suitable manner (not shown). The rate of spraying of the diacetone alcohol solution of the surface active agent is from about 1 pound to about 1½ pounds, based upon the total of the surface active agent, per 1000 pounds of glass fibers projected into the forming hood 14.

As fibers projected by the steam blowers 13 enter the upper extremity of the forming hood 14 they pass between deflector plates 16 which are suitably mounted for limited oscillatory movement as indicated by the arrows. The projected fibers are drawn downwardly through the hood 14 onto a foraminous conveyor 17, which is suitably driven in the direction indicated by the arrow, by a partial vacuum maintained in a suction box 18. The partial vacuum is maintained in the suction box 18 by discharging air therefrom in any suitable manner (not illustrated) through a duct 19. Approximately a 1 percent by weight silica sol is sprayed into the forming hood 14 through spray heads 20 which extend through the walls of the hood 14 near the lower extremity thereof, so that glass fibers associated with the 1 percent silica sol are collected on the conveyor 17. It has been found that the silica sol acts as a tackifying agent to prevent slipping of the mass of collected fibers during subsequent processing, and constitutes an important feature of the process.

As the conveyor 17 moves, as indicated, the mass of treated fibers collected thereon, which is designated 21, is moved to the right, outside the hood 14, under a roll 22, over a large diameter roll 23, under a small diameter roll 24, and onto a second foraminous conveyor 25, which is suitably driven in any suitable manner in the direction of the arrow. A binder composition such as that previously identified in Example 1 is supplied to a trough 26, which is positioned above the roll 23, from a suitable inlet 27. The binder composition is supplied to the trough 26 at a rate sufficient to cause overflow thereof onto the mass 21 of fibers to effect saturation thereof. Excess binder applied to the pack 21 flows therethrough and into a pan 28 from which it is drawn in a pipe 29 for recirculation. Any excess of the binder composition is extracted as the mat 21 is advanced by the conveyor 25 over a second suction box 30. A partial vacuum is maintained in the second suction box 30 by withdrawal of air therefrom through a duct 31. The saturated pack 21 is then advanced into a suitable curing oven (not illustrated) where the binder composition is converted to a hard, infusible condition.

On the basis of extensive testing it has been determined that the average break strength of mats produced as described above in connection with FIG. 3 were 36.88 pounds longitudinally of the mats, and 23.75 pounds laterally thereof. When, for purposes of comparison, but not in accordance with the invention, the same procedure was repeated except that no surfactant solution was applied to the fibers through the nozzles 15, and no tackifying agent was applied through the nozzles 20, the resulting mat had a break strength of 22.31 pounds longitudinally and 19.93 pounds laterally. Processing advantages were also noted as a consequence of the treatment of the fibers in accordance with the invention.

When the procedure described above with reference to FIG. 3 was repeated except that the tackifying agent was not applied through the nozzles 20, the mat which was produced had strength characteristics substantially as previously described, but was extremely difficult to handle during processing. The pack tended to slip relative to the conveyor rather than to feed as required through the apparatus. It will be appreciated, therefore, that the function of the silica sol is physical in nature rather than chemical, and that it acts as a tackifying agent. It will also be appreciated that any of numerous other tackifying agents can be used in place of the silica sol so long as their viscosity characteristics are appropriate to prevent slipping and they do not interfere with the cure of a suitable binder. For example, solutions in appropriate solvents of various acrylic resins and other thermoplastics can be used for this puropse. Various other changes and modifications will be apparent to one skilled in the art and can be made without departing from the spirit and scope of the invention as defined in the appended claim.

What we claim is:

A method for producing a vitreous fiber pack article which includes the steps of pulling streams of a fiber forming vitreous material from a body thereof, attenuating the streams into fibers, applying to freshly formed surfaces of the vitreous material a surface active agent that produces an aqueous dispersion having a pH from about 6 to about 8½, and that has a molecular structure which includes a hydrophobic portion and a hydrophilic portion, whereby the hydrophilic portion of the surface active agent is bonded to the surfaces of the fibers which are formed by the attenuation, projecting the fibers with the surface active agent bonded thereto through a high velocity stream of compressible fluid which attenuates the fibers, applying a silica sol as a tackifying agent to the fibers after they have been attenuated by the compressible fluid, collecting the fibers and associated tackifying agent on a foraminous conveyor in mat form, applying a hardenable binder to the mat, and converting the binder to a hardened condition.

References Cited by the Examiner

UNITED STATES PATENTS

| | | | |
|---|---|---|---|
| 2,335,463 | 11/1943 | Steinbock | 106—50 |
| 2,356,542 | 8/1944 | Sloan | 17—123 |
| 2,622,045 | 12/1952 | Ester | 117—139.5 |
| 2,801,189 | 7/1957 | Collier | 117—72 |
| 2,921,342 | 1/1960 | Siefert et al. | 18—47.3 |
| 3,056,705 | 10/1962 | Wong et al. | 154—43 |

FOREIGN PATENTS 588,493    12/1959    Canada.

EARL M. BERGERT, *Primary Examiner.*

CARL F. KRAFFT, R. J. CARLSON, P. DIER,
                      *Assistant Examiners.*